Figure 1:
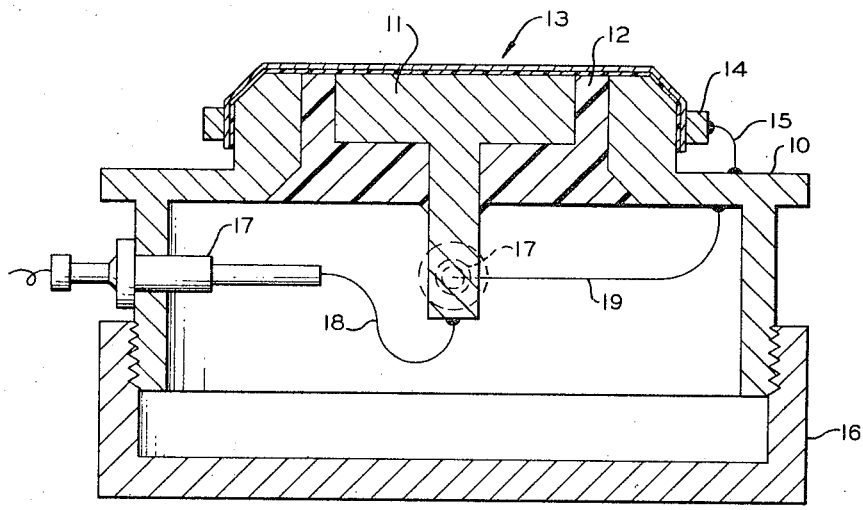

Jan. 23, 1968    L. B. ROOF ET AL    3,365,593
PIEZOELECTRIC TRANSDUCERS
Filed Oct. 21, 1965

INVENTORS
L. B. ROOF
GEORGE HALKIADES
BY
Young & Quigg
ATTORNEYS

United States Patent Office 3,365,593
Patented Jan. 23, 1968

3,365,593
PIEZOELECTRIC TRANSDUCERS
Lewis B. Roof and George Halkiades, Bartlesville, Okla., assignors to Phillips Petroleum Company, a corporation of Delaware
Filed Oct. 21, 1965, Ser. No. 500,022
5 Claims. (Cl. 310—8.7)

This invention relates to piezoelectric transducers for use in detecting and generating mechanical vibrations.

It is known that certain crystalline materials, such as quartz, exhibit a piezoelectric effect. When such materials are subjected to compression or tension, a deformation of the crystalline structure occurs which establishes an electrical potential across the material. If electrodes are attached to the two sides of the material, an electrical signal is generated which is representative of the applied mechanical forces. On the other hand, if an electrical signal is applied to the electrodes, mechanical displacements result in the crystalline structure. Thus, piezoelectric materials can be employed either as vibration detectors or as vibration generators.

A number of analysis instruments have recently been developed wherein acoustical vibrations are generated which are representative of a property of the material being analyzed. One such device that is useful as a detector in chromatographic analyzers is described in U.S. Patent No. 3,144,762, for example. For many applications, the mechanical properties of known piezoelectric crystals are such that the crystals are not readily adapted for use in construction of vibration detectors. In accordance with the present invention a novel vibration transducer is provided which utilizes a synthetic plastic material as a piezoelectric element. Plastic materials which have been found to be effective for this purpose are: polyethylene terephthalate, polytetrafluoroethylene, polyethylene, polypropylene, polyimide formed from the polycondensation reaction between pyromellitic dianhydride and an aromatic diamine, and copolymers of tetrafluoroethylene and hexafluoropropylene. These materials can readily be fabricated in any desired shape and are relatively low in cost. In one specific embodiment of this invention, vibration detecting apparatus is provided which employs a novel piezoelectric transducer to convert mechanical vibrations into corresponding electrical signals. These signals are then converted into output voltages, the magnitudes of which are proportional to the frequency of the established electrical signal. In another specific embodiment of this invention, an acoustical generator is provided which employs a novel piezoelectric transducer.

Figure 2:
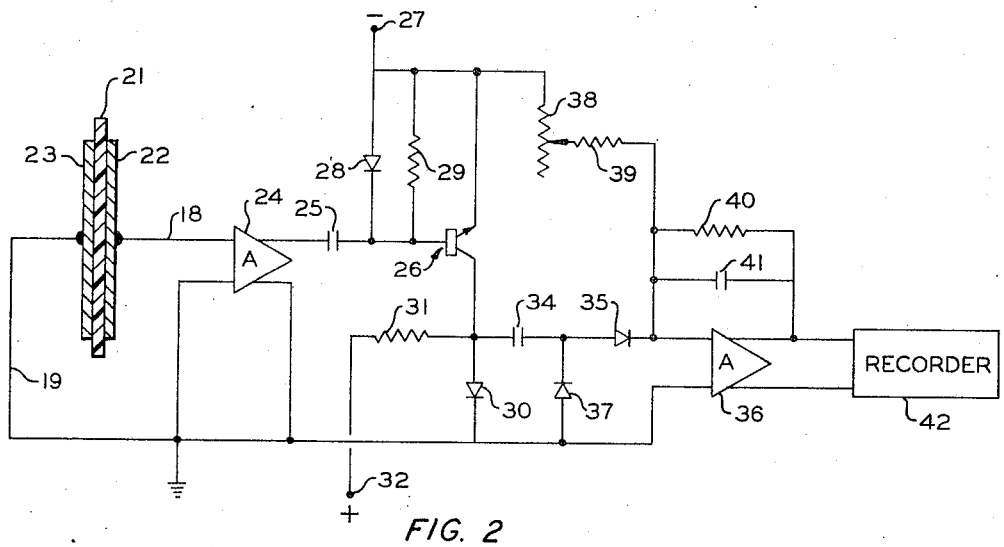
Figure 3:
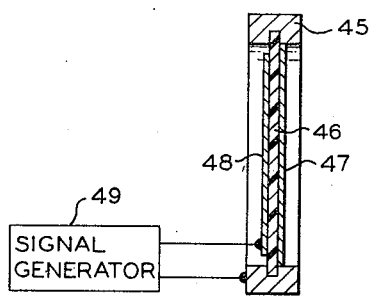

Accordingly, it is an object of this invention to provide improved vibration transducers which utilize plastic piezoelectric materials. Another object is to provide detectors for use in measuring mechanical vibrations. A further object is to provide acoustical signal generators utilizing piezoelectric transducers. Other objects, advantages and features of the invention should become apparent from the following detailed description, taken in conjunction with the accompanying drawings in which:

FIGURE 1 is a view, shown partially in section, of an embodiment of the piezoelectric transducer of this invention. FIGURE 2 is a schematic circuit drawing illustrating a detector circuit associated with the piezoelectric transducer. FIGURE 3 illustrates an acoustical signal generator which utilizes a piezoelectric transducer.

The transducer illustrated in FIGURE 1 is particularly useful in detecting mechanical vibrations, such as acoustical signals. This transducer comprises a generally cylindrical housing 10 which is formed of electrically conductive material. A cylindrical electrode 11 is mounted in spaced relationship with housing 10 by means of an insulating material 12. This material can advantageously be a plastic, such as an epoxy resin, that is poured into the region between elements 10 and 11 while in a molten state and which then solidifies to form a solid support. A membrane 13 extends across the top of electrode 11 and housing 10 and is anchored to the housing by means of a ring 14. Membrane 13 is formed of one of the plastic piezoelectric materials of this invention and has a metallic film disposed on the outer side thereof. This metallic film is thus engaged by ring 14 which is electrically connected to housing 10, such as by a wire 15. A cap 16 is threaded to the lower end of housing 10. A pair of tubes 17 extend through the side wall of the housing to pass respective electric leads 18 and 19. Lead 18 is connected to electrode 11, and lead 19 is connected to housing 10.

The plastic material which forms membrane 13 has piezoelectric properties. When the membrane is subjected to mechanical vibrations, such as by being exposed to acoustical waves, the membrane is deformed internally so that an electrical potential is established between electrode 11 and the metallic film on the outer surface of the membrane. This results in an output signal appearing between leads 18 and 19. A circuit which can be employed to advantage to measure the output signal between leads 18 and 19 is illustrated in FIGURE 2. The transducer is shown schematically as comprising a piezoelectric membrane 21 positioned between electrodes 22 and 23. Electrical leads 18 and 19 are connected to the respective input terminals of an amplifier 24. The first output terminal of amplifier 24 is connected by a capacitor 25 to the base of a transistor 26. A rectifier 28 is connected between a negative potential terminal 27 and the base of transistor 26. A resistor 29 is connected in parallel with rectifier 28. The emitter of transistor 26 is connected directly to terminal 27. A rectifier 30 is connected between the collector of transistor 26 and ground, and a resistor 31 is connected between the collector of transistor 26 and a positive potential terminal 32.

A capacitor 34 and a rectifier 35 are connected in series between the collector of transistor 26 and the first input terminal of an operational amplifier 36. A rectifier 37 is connected between the grounded second input terminal of amplifier 36 and the junction between elements 34 and 35. Resistors 38 and 39 are connected between terminal 27 and the first input terminal of amplifier 36. A resistor 40 and a capacitor 41 are connected in parallel with one another between the output and input terminals of amplifier 36 to form a feedback network. The output terminals of amplifier 36 are connected to a recorder 42.

When the transducer is subjected to fluctuating mechanical vibrations, such as acoustical waves, a corresponding fluctuating electrical potential is established between the input terminals of amplifier 24. This signal is amplified and applied to the input of the electronic switch formed by transistor 26. Capacitor 34 and the rectifiers associated therewith transmit an output current to amplifier 36, the amplitude of such current being proportional to the frequency at which transistor 26 is actuated. An output voltage is thus recorded which is representative of the frequency of the mechanical vibrations being detected.

Resistors 38 and 39 form a zero adjustment network which increases the sensitivity of the detector. Variable resistor 38 can be adjusted until the output signal from amplifier 36 is zero with a constant frequency input signal being applied to amplifier 24. With the transducers employed in a chromatographic analyzer, for example, a signal of constant frequency is obtained initially when the carrier gas alone appears in the column effluent. Resistor 38 is adjusted at this time until the recorded signal is zero. Any change in composition of the effluent gas due to the elution of materials being detected thus changes the frequency of the signal established by the detector so that the transducer provides an output signal at a different frequency. The magnitude of the voltage applied to recorder 42 at this time is thus indicative of the change in frequency of the signal, and thus of the change in composition of the chromatographic column effluent.

In one specific embodiment of this invention, membrane 13 was formed of Mylar (polyethylene terephthalate) with an aluminized outer surface. The membrane was approximately 0.0002 inch thick, and the diameter of electrode 11 was approximately ¼ inch. A voltage of approximately 1 millivolt was produced across a resistance of 2 megohms when the transducer was subjected to high intensity sound vibrations at a frequency of approximately 50 kilocycles per second.

As previously mentioned, the transducer of this invention can also be employed to advantage for the purpose of generating mechanical vibrations. An embodiment of the transducer which can be employed to advantage for this purpose is illustrated in FIGURE 3. A diaphragm 46 of piezoelectric material is secured to a retaining ring 45. Metallic sheets 47 and 48 are secured to member 46 to form the two electrodes. The output terminals of an electrical signal generator are connected to the two electrodes to apply a potential difference across member 46. Member 46 thus vibrates at the frequency of the signal which is applied to the electrodes by generator 49. The transducer of FIGURE 3 can thus be employed to establish acoustical signals at the frequency of the applied electrical signal.

While this invention has been described in conjunction with presently preferred embodiments, it obviously is not limited thereto.

What is claimed is:

1. Vibration detecting apparatus comprising: first and second electrodes spaced from one another; a member engaging said electrodes and extending therebetween so as to be adapted to be subjected to vibrations to be detected, said member comprising a material selected from the group consisting of polyethylene terephthalate, polytetrafluoroethylene, polyethylene, polypropylene, polyimide formed from the polycondensation reaction between pyromellitic dianhydride and an aromatic diamine, and copolymers of tetrafluoroethylene and hexafluoropropylene; an electrical signal detector having first and second inputs; and means connecting said first and second electrodes to said first and second inputs, respectively.

2. The detecting apparatus of claim 1 wherein said detector comprises circuit means to establish a voltage, the magnitude of which is proportional to the frequency of the vibrations impinging on said member, and means to measure the magnitude of said voltage.

3. The detecting apparatus of claim 1 wherein said detector comprises first amplifier means having said electrodes connected to the input terminals thereof, second amplifier means, a capacitor and a first rectifier connected in series between the output of said first amplifier means and the input of said second amplifier means, a voltage source connected between the output of said first amplifiers means and said capacitor, a second rectifier connected between the output of said first amplifier means and a point of reference potential, a third rectifier connected between said point of reference potential and the junction between said capacitor and said first rectifier, and detector means connected to the output of said second amplifier means.

4. The detecting apparatus of claim 3, further comprising means to apply a preselected bias voltage to the input of said second amplifier means.

5. The detecting apparatus of claim 1 wherein said electrodes and said member comprise: a housing having an opening therein; a support of electrically conductive material disposed in said opening, said support forming said first electrode; a sheet of material extending across said opening so that one side of said sheet engages said support, said sheet forming said member; and a coating of electrically conductive material on the second side of said sheet, said coating forming said second electrode.

References Cited
UNITED STATES PATENTS

| | | | |
|---|---|---|---|
| 3,322,980 | 5/1967 | Faure | 310—8.7 |
| 3,239,696 | 3/1966 | Burkhalter | 310—8.6 |
| 3,130,329 | 4/1964 | Cother | 310—8.1 |
| 3,086,132 | 4/1963 | Ostrow | 310—8.8 |
| 2,748,369 | 5/1956 | Smyth | 340—10 |

MILTON O. HIRSHFIELD, *Primary Examiner.*

J. D. MILLER, *Examiner.*